United States Patent [19]

Bohm et al.

[11] 4,220,512

[45] Sep. 2, 1980

[54] MORPHOLOGY STABILIZATION OF HETEROGENEOUS POLYMER BLENDS

[75] Inventors: Georg G. A. Bohm, Akron; Charles J. Nelson, Munroe Falls, both of Ohio

[73] Assignee: The Firestone Tire & Rubber Company, Akron, Ohio

[21] Appl. No.: 761,560

[22] Filed: Jan. 24, 1977

[51] Int. Cl.³ .......................... C08H 3/28; C08H 3/24; C08L 7/00; C08L 9/00
[52] U.S. Cl. ........................... 204/159.12; 204/159.13; 204/159.14; 204/159.2; 204/160.1; 260/5; 525/103; 525/105; 525/106; 525/232; 525/236
[58] Field of Search ...................... 204/159.13, 159.14, 204/159.2; 260/889

[56] References Cited

U.S. PATENT DOCUMENTS

| | | | |
|---|---|---|---|
| 2,961,389 | 11/1960 | Hines et al. | 204/159.2 |
| 3,494,983 | 2/1970 | Diem | 260/878 |
| 3,616,362 | 10/1971 | Soldatos | 204/159.14 |
| 3,616,365 | 10/1971 | Stastny et al. | 204/159.14 |
| 3,637,544 | 1/1972 | Lundberg et al. | 204/159.13 X |
| 3,709,806 | 1/1973 | Minami et al. | 204/159.2 |
| 3,836,509 | 9/1974 | Colomb, Jr. et al. | 204/159.13 X |
| 3,855,379 | 12/1974 | Araki et al. | 204/159.2 |
| 3,865,897 | 2/1975 | Falender et al. | 204/159.13 X |
| 4,089,820 | 5/1978 | Wright | 260/889 |

*Primary Examiner*—Wilbert J. Briggs, Sr.

[57] ABSTRACT

A heterogeneous blend of elastomers having a stabilized morphology, as well as the method of making the same, comprises at least two radiation cross-linkable elastomers which form a heterogeneous blend. The radiation cross-linkable elastomer components are selected from the class consisting of conjugated dienes having from 4 to 12 carbon atoms, natural rubber, polyalkenamers such as polypentenamer, chlorinated polyolefinic elastomers having from 2 to 8 carbon atoms such as chlorinated polyethylene, ethylenepropylene terpolymers, polysiloxanes, nitrile rubber, butadiene-acrylic copolymers, chlorosulfonated polyethylene, butadiene vinyl pyridine copolymers, substituted phosphazenes, aliphatic polyesters which are substantially non-crystalline and have 6 carbon atoms or more in the repeating unit, preferably from 6 to 12 carbon atoms, butyl copolymers containing groups with unsaturation, a butadiene-styrene copolymer and a copolymer, terpolymer, etc., made from a conjugated diene having from 4 to 12 carbon atoms and from monomers selected from the class consisting of a vinyl aromatic having from 8 to 15 carbon atoms, acrylonitrile, and olefins having from 2 to 8 carbon atoms. The morphology of the heterogeneous blend is greatly improved or fully stabilized by irradiating to a point below to slightly above the gel dose of the blend, that is up to a point where the blend has 15 percent and preferably up to 5 percent gel. The greatly improved or fully stabilized morphology permits conventional processing steps to be carried out where shear is involved such as in milling, extruding, compression or injection molding, and the like such that the final morphology of the blend, after processing, is substantially the same as the initial morphology. Examples of specific heterogeneous elastomeric blends include nitrile rubber blended with an EPDM polymer, styrene-butadiene blended with an EPDM polymer, and polybutadiene blended with an EPDM polymer.

14 Claims, No Drawings

MORPHOLOGY STABILIZATION OF HETEROGENEOUS POLYMER BLENDS

BACKGROUND OF THE INVENTION

The present invention relates to a heterogeneous blend of elastomers which has a greatly improved or fully stabilized morphology so that upon processing, the morphology is substantially unchanged. More specifically, the present invention relates to a heterogeneous blend of radiation cross-linkable elastomers which has a greatly improved or fully stabilized morphology as well as to a method for producing said blends which are obtained by irradiating to a point below to slightly above the gel dose of the blend.

Heretofore, it has been known that mixing, molding, milling, extruding, and other processing techniques can significantly alter the morphology of a heterogeneous blend such as that made from elastomers. For example, if polymers A and B were mixed to obtain a heterogeneous blend wherein the Phase B elastomer was dispersed in a continuous matrix of Phase A elastomer, during subsequent molding of the mix, the domain size of the Phase B particles as well as the dispersement thereof would change. In some situations, the change was such that Phase A would become the dispersed phase in a continuous matrix of Phase B. Hence, the end result after processing a heterogeneous blend was that the final morphology was significantly different from the initial or preprocessed morphology and thus a final predictable morphology or desirable dispersement was difficult, if not impossible, to obtain. Thus, in the case of a series of sequential processing steps, the production of a final product having a desired and specific morphology was merely a chance result in that a desired morphology could not consistently be produced. Such subsequent changes in the morphology of heterogeneous blends of elastomers are very undesirable in various elastomeric processes wherein a desired morphology is desired prior to and after curing. While moderate levels of vulcanization or curing of such blends would stabilize the morphology, such stabilized blends could not be subjected to any further processing. The problem of changing morphology upon processing is particularly acute in the production of tires.

SUMMARY OF THE INVENTION

It is therefore an object of the present invention to provide a greatly improved or fully stabilized morphology for heterogeneous blends of elastomers so that upon processing, the change in morphology is minimized.

It is another object of the present invention to provide a heterogeneous blend of radiation curable elastomers having an improved morphology, as above, wherein said blend is stabilized by irradiating in a range from a point below to slightly above the gel point of said blend.

It is a further object of the present invention to provide a heterogeneous blend of elastomers having an improved morphology stability, as above, wherein the morphology is not unduly effected by shear processes such as milling and extruding.

It is a yet further object of the present invention to provide a heterogeneous blend of elastomers having an improved morphology stability, as above, wherein the blend can be compounded with various antioxidants, accelerators, oils, clays, silicas, carbon black, pigments, and the like.

It is a yet further object of the present invention to provide heterogeneous blends of elastomers having an improved morphology stability, as above, wherein said blend is irradiated to an extent such that the gel content of said blend is 15 percent or less.

It is yet a further object of the present invention to provide a heterogeneous blend of elastomers having an improved morphology stability, as above, wherein the radiation cross-linkable elastomer components are selected from the class consisting of conjugated dienes having from 4 to 12 carbon atoms, natural rubber, polyalkenamers such as polypentenamer chlorinated polyolefinic elastomers having from 2 to 8 carbon atoms such as chlorinated polyethylene, ethylene-propylene terpolymers, polysiloxanes, nitrile rubber, butadiene-acrylic copolymers, chlorosulfonated polyethylene, butadiene vinyl pyridine copolymers, substituted phosphazenes, aliphatic polyesters which are substantially non-crystalline and have 6 carbon atoms or more in the repeating unit, preferably from 6 to 12 carbon atoms, butyl copolymers containing groups with unsaturation, a butadiene-styrene copolymer and a copolymer, terpolymer, etc., made from a conjugated diene having from 4 to 12 carbon atoms and from monomers selected from the class consisting of a vinyl aromatic having from 8 to 15 carbon atoms, acrylonitrile, and olefins having from 2 to 8 carbon atoms.

Generally, a heterogeneous elastomer blend having an improved morphology stability comprises, at least two cross-linkable elastomer components forming a heterogeneous blend and are selected from the class consisting of conjugated dienes having from 4 to 12 carbon atoms, natural rubber, polyalkenamers such as polypentenamer, chlorinated polyolefinic elastomers having from 2 to 8 carbon atoms such as chlorinated polyethylene, ethylenepropylene terpolymers, polysiloxanes, nitrile rubber, butadiene-acrylic copolymers, chlorosulfonated polyethylene, butadiene vinyl pyridine copolymers, substituted phosphazenes, aliphatic polyesters which are substantially non-crystalline and have 6 carbon atoms or more in the repeating unit, preferably from 6 to 12 carbon atoms, butyl copolymers containing groups with unsaturation, a butadiene-styrene copolymer and a copolymer, terpolymer, etc., made from a conjugated diene having from 4 to 12 carbon atoms and from monomers selected from the class consisting of a vinyl aromatic having from 8 to 15 carbon atoms, acrylonitrile, and olefins having from 2 to 8 carbon atoms, said heterogeneous blend having an improved morphology stability, said improved morphology stability formed by irradiating said blend to a point in a range from below to slightly above the gel dose of said blend.

Generally, a process for making a heterogeneous elastomer blend having an improved morphology stability comprises, the steps of, blending at least 2 cross-linkable elastomer components to form a heterogeneous blend, said components selected from the class consisting of conjugated dienes having from 4 to 12 carbon atoms, natural rubber, polyalkenamers such as polypentenamer, chlorinated polyolefinic elastomers having from 2 to 8 carbon atoms such as chlorinated polyethylene, ethylene-propylene terpolymers, polysiloxanes, nitrile rubber, butadiene-acrylic copolymers, chlorosulfonated polyethylene, butadiene vinyl pyridine copolymers, substituted phosphazenes, aliphatic polyesters which are substantially non-crystalline and have 6 carbon atoms or more in the repeating unit, preferably from 6 to 12 carbon atoms, butyl copolymers containing groups with unsaturation, a butadiene-styrene copolymer and a copolymer, terpolymer, etc., made from a conjugated diene having from 4 to 12 carbon atoms and from monomers selected from the class consisting of a vinyl aromatic having from 8 to 15 carbon atoms, acrylonitrile, and olefins having from 2 to 8 carbon atoms, and irradiating said heterogeneous blend to a point in a range from below to slightly above the gel dose of said blend to improve the morphology stability of said blend.

DESCRIPTION OF THE PREFERRED EMBODIMENTS

A stabilized morphology of heterogeneous blends of radiation curable elastomers is achieved by irradiating the blend to an amount in a range from below to slightly above the gel dose. The particular irradiation curable elastomers which are added together and then mixed to form a heterogeneous blend constitute at least two types of elastomers with at least one of the elastomers being heterogeneous when blended with the remaining elastomers. Generally, the blends contain only two elastomers. In order to practice the present invention, generally three criteria must be met. The first is that the polymeric components, exclusive of compounding ingredients, must be elastomeric. The second criteria is that the elastomers or the polymeric components must be cross-linkable by irradiation. The third criteria is that the blend system formed utilizing at least two elastomers or polymeric components must be heterogeneous. The various cross-linkable elastomer components which may be utilized in the present invention are selected from the class consisting of conjugated dienes having from 4 to 12 carbon atoms, natural rubber, polypentenamer, chlorinated polyolefinic elastomers having from 2 to 8 carbon atoms such as chlorinated polyethylene, ethylene-propylene terpolymers, polysiloxanes, nitrile rubber, butadiene-acrylic copolymers, chlorosulfonated polyethylene, butadiene vinyl pyridine copolymers, substituted phosphazenes, aliphatic polyesters which are substantially non-crystalline and have 6 carbon atoms or more in the repeating unit, preferably from 6 to 12 carbon atoms, butyl copolymers containing groups with unsaturation, a butadiene-styrene copolymer, and a copolymer, terpolymer, etc., made from a conjugated diene having from 4 to 12 carbon atoms and from monomers selected from the class consisting of a vinyl aromatic having from 8 to 15 carbon atoms, acrylonitrile, and olefins having from 2 to 8 carbon atoms. The various geometric isomers of the various above-set forth elastomers may be utilized.

Considering the elastomers made from dienes, they may be made according to any conventional method or manner and specific examples of diene monomers include butadiene, isoprene, pentadiene, hexadiene, heptadiene, octadiene, 2,3-dimethylbutadiene, and the like. Preferred elastomers are made from butadiene and isoprene.

A heterogeneous blend may be formed utilizing elastomers of polybutadiene having a large difference in the vinyl content, that is the amount of the 1,2 addition units. Generally, elastomers having a low vinyl content such as about 13 percent, or under approximately 30 percent, will form a heterogeneous blend with the high vinyl polybutadiene compounds. A high vinyl polybutadiene compound is defined as a polymer or copolymer in which at least 80 percent of the butadiene contained in the polymer has butadiene in the 1,2 configuration.

Considering the copolymer of butadiene-styrene, it contains at least 40 percent by weight of butadiene and preferably at least 60 percent. Considering the various vinyl aromatic monomers, they have from 8 to 15 carbon atoms and are reacted with the conjugated dienes to form a copolymer, terpolymer, etc. Specific examples include styrene, alpha-methylstyrene, and the like with styrene being preferred. Hence, a preferred copolymer is butadiene-styrene. Examples of olefins which are reacted with the dienes to form a copolymer, terpolymer, etc., include ethylene, propylene, butylene, hexadiene, and the like with ethylene and propylene being preferred. Of course when ethylene and propylene are utilized along with the diene, an EPDM type polymer is formed. The type of diene monomer utilized in the formation of EPDM rubber is generally well known to those skilled in the art and includes butadiene, dicyclopentadiene, ethylene norborene, and 1,4-hexadiene.

The acrylonitrile monomers used in combination with dienes and specifically butadiene monomers generally form a copolymer known as a nitrile rubber. Usually the ratio of the two monomers and nitrile rubber is similar to the ratio of butadiene to styrene in styrene-butadiene rubber.

Considering the remaining elastomers or polymeric components set forth above, they are made in accordance with conventional practices and are generally well known to those skilled in the art. These include natural rubber, polyalkenamers, various chlorinated polyolefinic elastomers, various ethylene-propylene terpolymers, various polysiloxanes, various butadieneacrylic copolymers, various chlorosulfonated polyethylenes, various butadiene vinyl pyridine copolymers, various phosphazenes which, of course, have a phosphorous-nitrogen backbone, and the various aliphatic polyesters. The polyester polymers which are elastomeric are the straight chain polymers which contain at least 6 to 12 carbon atoms in the repeating unit and substantially are non-crystalline. Additionally, the butyl copolymers containing groups with unsaturation such as isoprene, are also well known to those skilled in the art and may be made in a conventional manner. As previously noted, it is understood that various geometric isomers of the above elastomers are included in each of the cited classes.

According to the present invention, generally the blending of at least one elastomer from one of the above set forth groups with at least another or a second elastomer from any of the remaining groups results in a heterogeneous blend. The reason for this is that the mixing of the elastomer is normally an endothermic process and the entropy of mixing is small. Thus, the blends tend to be heterogeneous. A specific pair which is not heterogeneous but rather is homogeneous are some butadiene and styrene-butadiene elastomer combinations. Of course, as noted, generally any pair of the above groups tends to be heterogeneous and the verification of this fact by one skilled in the art with regard to a specific elastomer of one group blended with a specific elastomer of another group can be quickly verified. By the term "heterogeneous blend" it is meant a system which is not uniform throughout but consists of phases separated by boundaries. In the present invention, systems having phase dimensions of various particles of 100 angstrom units or greater are heterogeneous. That is, the size of the dispersed particles of one phase as well as the size of the particles, domain, etc., of any remaining particles of another phase, are 100 angstroms or greater. Examples of combinations of specific elastomers as described above which result in a heterogeneous blend, include an elastomer made from the ethylene-propylene-diene monomers (EPDM) blended with polybutadiene, a blend of EPDM and styrene-butadiene rubber, a blend of nitrile rubber with EPDM, a blend from low vinyl (e.g., 13 percent), polybutadiene with a high vinyl (80 percent plus) polybutadiene, a blend of natural rubber with styrenebutadiene rubber, and a blend of natural rubber with butadiene.

Generally, the amount of one elastomer to the second elastomer or remaining elastomers ranges from about 10 percent to about 90 percent by weight with the preferred range being from 25 percent to about 75 percent.

The molecular weight of the various elastomers of the above set forth groups may vary over a broad molecular weight range. That is, the elastomers may have a molecular weight of from 10,000 to about 10,000,000 and preferably from about 50,000 to about 1,000,000. The reason for the high end of the molecular weight range being large, is that some of the elastomers have large pendant groups on the polymer backbone. Thus, the elastomer has a high molecular weight even though the chain length may be similar to a lower molecular weight elastomer without such large pendant groups.

The heterogeneous blend is greatly improved or fully stabilized with regard to its morphology by irradiating it to a point in a range from below to slightly above the gel dose of the blend. For the purpose of this invention, the "gel dose" is defined as an amount of irradiation which produces 5 percent gel content in the blend. Additionally, it is to be understood by the term "slightly above" it is meant from about 6 or 8 percent and up to 15 percent gel content and that by the term "below" it is meant from no gel or desirably 0.1 percent to about 4 percent. Preferably, an amount of irradiation which produces no more than 5 or 6 percent gel is desired with an amount of from about 0.1 to about 4.0 being highly preferred. The gel content is easily calculated in accordance with standard testing procedures. A specific example of such a testing procedure involves the use of toluene, C.P. grade, and a trace of an antioxidant such as 0.5 PHR of DBPC (dibutyl-para-cresol). The sample weight is about 0.10±0.05 grams of the cut polymer. The sample is then placed in a 4–6 oz. jar and toluene containing DBPC is added. The solvent level in the jar should be kept high, but not closer than 0.5 inches to the cap. This mixture is then heated to 90°–110° C. The solvent is exchanged every 24 hours or so. Minimum extraction time is 72 hours. The undissolved portion of the sample is then dried at 100°–120° C. until constant weight is reached. The gel content is calculated according to the following formula:

$$\% \text{ gel} = 100 \frac{\text{weight of dry gel}}{\text{initial sample weight}}$$

Generally, the amount of radiation required tends to increase with decreasing molecular weight of the elastomers of the blend. The actual amount of irradiation will thus vary with the molecular weight as well as the individual types of elastomers utilized and the amount and type of oil and anti-oxidants present. However, a range from about 0.1 to about 20.0 megarads is generally sufficient to greatly improve the stability of the blend morphology. Blends which are irradiated well above the gel dose, that is having a gel content in excess of 15 percent, are not within the scope of the present invention since such blends are usually "cured" and thus difficult or impossible to process. The irradiation can be carried out at ambient temperatures, or if desired, at low temperatures, even liquid nitrogen temperatures. The latter temperature is sometimes utilized when a blend is produced and cannot be irradiated within a reasonable time period since upon standing for a few minutes, it may undergo a morphology change. Hence, in this situation, upon the production of the blend, it can be subjected immediately to low temperature quench such as a liquid nitrogen bath in order to prevent the morphology change. Then the blend can be stored and even irradiated at low temperature or subsequently after the quench but before any morphology change occurs.

The irradiation source may be any conventional machine or apparatus utilized in the art. The preferred sources are electron accelerators which produce high energy, high intensity electron beams. The energy requirements of this accelerator will depend upon the thickness of the elastomer blend being irradiated or prevulcanized. Electron accelerators with energy ratings of from 10 Kev to 10 Mev are currently available and suitable for the practice of the present invention. The actual time of irradiation is usually short such as on the order of 5 to 10 seconds.

The heterogeneous elastomer blends of the present invention, when irradiated to an extent such that the amount of gel is less than 15 percent or preferably 5 percent or less, can be easily and readily processed and yet substantially, if not fully, maintain the morphology present at the time of irradiation. This result is both surprising and unexpected in that the amount of irradiation is slight and generally below the gel point or general onset of gellation throughout a blend or polymer. Furthermore, processing involving high shear as well as high temperatures have been found not to unduly effect the stabilization of the morphology of the blends. For example, the blends can be milled, extruded, annealed, molded, injection molded, and otherwise processed without significantly altering the morphology. Moreover, it has been found that the greatly improved maintenance of the same morphology at the time of irradiation or the fully stabilized morphology results in highly improved product uniformity as well as generally improved physical properties such as tensile strength and the like. These properties tend to be adversely affected during compression molding operation and the like. Hence, the present invention overcomes these shortcomings. It is further noted that in conventional curing utilizing sulfur and peroxide curatives, the curing takes place during molding operations. Thus, the morphology changes can occur before the material is actually cured. This drawback is also avoided by the present invention as revealed by the examples.

Thus the present invention can be utilized whenever a fixed or desirable morphology is sought after processing or in the finished article. That is, a heterogeneous blend may be prepared and mixed until a desired morphology is obtained. This result is usually readily achieved by mixing two or more heterogeneous elastomers in fixed amounts and under specific conditions for a fixed period of time. Then, the heterogeneous blend is irradiated to a point from below to slightly above the gel dose such that less than 15 percent, preferably about 5 percent or less, of the blend is gelled. Unlike the prior art processes, further processing of the irradiated heterogeneous blend will not change the fixed morphology so that a final product is produced having the same morphology as at before irradiation. This result is useful in a great number of areas. A specific area is in the production of tires. Due to the improved, if not full, stabilization of the morphology, the tire-to-tire uniformity of tire components, be it the carcass or the tread, is increased. In the carcass this tends to result in a greater consistency in producing strong, durable, and longer lasting items. In the tread, this generally results in a greater consistency in obtaining tires with good wear due to the suppression in the growth of domain sizes during storage of the green rubber and during molding of the product. That is, it generally takes more energy to rupture a polymer blend with small domain sizes than a polymer with large domain sizes. A yet further advantage is an increased resistance to ozone for various blends of ozone and non-ozone resistant elastomers such as polybutadiene/EPDM and styrene-butadiene/EPDM blends, since a small domain or dispersed particle size can be achieved. According to prior conventional practice, the domain size upon post-mixing, processing, and particularly during curing would tend to grow and thus be more subject to ozone degradation.

The various elastomer blends may be compounded in accordance with conventional practices using conventional filters such as carbon black, silica, various clays, various antioxidants, various curing agents, various accelerators, various oils such as aromatic and naphthalenic for rubbers and tires, various pigments, and the like. The amount of such compounding agents are conventional and known to those skilled in the art. Thus, blends such as butadiene and natural rubber, butadiene and a copolymer of butadiene and styrene, polyisoprene and polybutadiene, and the like is utilized in the formation of tires and may be compounded with carbon black, silica, aromatic oils, stearic acid, and the like.

Specific areas of use include belting, hoses, molded goods, shoe soles, fuel tanks, various tire components such as side walls and treads, as well as all conventional uses for the above-listed elastomer blends.

Once the heterogeneous blend has been irradiated and processed to form a final suitable article, it may then be cured. Generally, conventional chemical curatives such as sulfur, various sulfur compounds and various organic peroxides may be utilized. Alternatively, a high dosage of irradiation may be used to cure the final product. Regardless of the type of cure, the amount of irradiation or the amount and type of various chemical curing agents utilized are well within the knowledge of one skilled in the art.

The invention will be better understood by reference to the following examples. Blend morphology was observed using transmission electron microscopy. A representative portion of the blend was microtomed at a low temperature, followed by staining with osmium tetraoxide. A more detailed description of this analysis is set forth in Rubber Chemistry and Technology, Volume 46, Page 653, 1973 by J. Kruse, and in Rubber Chemistry and Technology, Volume 47, Page 64, 1974 by J. C. Andries, both articles hereby fully incorporated by reference with regard to the specific test procedure and the discussion contained therein.

EXAMPLE I

Fifty parts by weight of a low vinyl (approximately 13 percent-1,2 units) polybutadiene (Diene 35 ® manufactured by Firestone Tire and Rubber Company) having a number average molecular weight of 110,000, 50 parts of EPDM (Royalene 301 ® manufactured by Uniroyal) having a number average molecular weight of 58,000, 72 mole percent of ethylene, 3.7 carbon-to carbon double bonds per 1,000 carbon atoms with the diene being dicyclopentadiene, and a ratio of the weight average molecular weight to the number average molecular weight of approximately 5, and 1 part of DBPC (dibutylpara-cresol) were mixed in a Banbury mixer for 15 minutes. The mix was then extruded at 150° using a 0.8 inch Dual Worm Plastics Extruder from WELDING ENGINEERS, INC., followed by rapid quenching of the extrudate in liquid nitrogen and subsequent storage in dry ice. The samples were later removed from the dry ice and subjected to radiation dose levels, 0, 0.24, 0.47, and 14 Mrad. After curing, these samples were annealed at 100° C. for 1 hour. The effect of radiation dose level on domain size, which is a measure of morphology stability, is described below:

| $r/r_g$ | $D(\mu m)$ |
|---|---|
| 0 (Control) | 16 |
| 0.17 | 6.0 |
| 0.34 | 4.8 |
| 10. (Complete cure) | 4.5 |

$r$ = radiation dose
$r_g$ = radiation dose for onset of gel formation (i.e. 5 percent gel)
$D$ = average domain thickness The radiation gel dose ($r_g$) for Diene 35 ® and Royalene 301 ® is in the neighborhood of 1.4 Mrad and hence for the blend.

Thus, it is readily apparent that small amounts of irradiation curing well below the gel dose resulted in a significant improvement in the stabilization of the morphology. As apparent from the data, this stabilization was almost equal to that obtained upon complete curing.

EXAMPLE II

Fifty parts of EPDM having a number average molecular weight of 47,000 and 57 parts of a medium vinyl (50 percent-1,2 units) polybutadiene having a number average molecular weight of 283,000 along with 1 part of DBPC (dibutyl-para-cresol), were mixed in a Brabender at 100° C. at 40 rpm for one-half hour. The medium vinyl polybutadiene elastomer was made by anionic polymerization utilizing n-butyl lithium as a catalyst at room temperature and THF (tetrahydrofuran) as a modifier. The EPDM contained 66 mole percent of ethylene. The ratio of the weight average molecular weight to the number average weight was approximately 4 to 5 and the number of double bond groups per 1,000 carbon atoms was approximately 3 to 4. Immediately after mixing, three plaques were compression molded (100° C. for 5 minutes). After molding, the samples were stored in dry ice. After removal from the dry ice, one of the plaques were subjected to a 0.4 Mrad radiation dose, press aged at 100° C. for 18 hours and then radiation cured (9.1 Mrad). This blend was then given the designation 2A. A second plaque, which was not precured, was also press aged and radiation cured under the same conditions at the same time as blend 2A was processed. This blend was then given the designation 2B. The domain size of blend 2A was 5 μm (micrometers) compared to the 50 μm domain sizes of blend 2B. The third plaque (blend 2C), which had not been subjected to the additional press aging of 18 hours at 100° C., which was radiation cured (9.1 Mrad) immediately after removal from dry ice, exhibited a domain size of 1–2 μm. The gel dose for the EPDM and polybutadiene was 4 and 0.5 Mrad, respectively. Less than 5 percent gel was present in the irradiated blend (2A).

Thus, a greatly improved morphology stabilization was obtained with Example 2A then with the Control 2B. Moreover, it is noted that the morphology improvement for a heterogeneous blend of radiation crosslinkable elastomers was obtained utilizing 2 components having a significantly different gel dose for the individual components.

EXAMPLE III

Blends 2A, 2B, and 2C from Example II, along with the radiation cured (9.1 Mrad) component individual polymers, i.e., polybutadiene and EPDM, were ozone aged (94° F., 67 pphm ozone) using the bent sample configuration described in ASTM D518. After ozone aging, no cracking was noted for blends 2A and 2C, nor, of course for the EPDM component. Blend 2B did show evidence of ozone cracking. The extent of cracking was extensive for the polybutadiene component.

Thus, Example III readily shows that ozone resistance of the blend is increased by precure irradiation according to the present invention.

While in accordance with the patent statutes, preferred embodiments have been illustrated and described in detail, it is to be understood that the invention is not limited thereto, the scope of the invention being measured by the scope of the attached claims.

What is claimed is:

1. A process for making a heterogeneous elastomer blend having a stabilized morphology, comprising the steps of:
   blending elastomer components to form the heterogeneous blend,
   said elastomer components made from conjugated dienes having from 4 to 12 carbon atoms and an ethylene-propylenediene terpolymer elastomer,
   the number average molecular weight of said elastomer component made from conjugated dienes and said ethylene-propylene-diene terpolymer elastomer ranging from about 50,000 to about 1,000,000,
   said heterogeneous elastomer blend containing from about 10 percent to about 90 percent by weight of said elastomer made from said conjugated dienes and from about 10 percent to about 90 percent by weight of said ethylene-propylene-diene terpolymer,
   said heterogeneous elastomer blend having an initial morphology,
   crosslinking said heterogeneous elastomer by irradiating said elastomer blend,
   irradiating said elastomer blend to an extent such that said elastomer blend contains from about 0.1 to 15 percent gel, and
   processing said irradiated heterogeneous elastomer blend,
   said processed irradiated heterogeneous elastomer blend having essentially the same morphology as said initial morphology so that a stabilized morphology is formed.

2. A process according to claim 1, wherein the amount of irradiation ranges from about 0.1 to about 20.0 Megarads.

3. A process according to claim 1, wherein said elastomer components are selected from the class consisting of polybutadiene, polyisoprene, polypentadiene, polyhexadiene, polyheptadiene, polyoctadiene, and poly-2-dimethylbutadiene.

4. A process according to claim 3, the amount of gel in said blend is about 0.1 percent up to 5 percent.

5. A process according to claim 3, wherein said diene of said ethylene-propylene-diene terpolymer is selected from the class consisting of butadiene, dicyclopentadiene, ethylene norborene, hexadiene and isoprene.

6. A process according to claim 5, wherein the amount of said elastomer made from conjugated dienes ranges from about 25 percent to about 75 percent by weight of said blend and wherein the amount of said ethylene-propylene-diene terpolymer elastomer ranges from about 75 percent to about 25 percent by weight of said blend.

7. A process according to claim 3, wherein the amount of said elastomer made from conjugated dienes ranging from about 25 percent to about 75 percent by weight of said blend and wherein the amount of said ethylene-propylene-diene terpolymer elastomer ranges from about 75 percent to about 25 percent by weight of said blend.

8. A process according to claim 4, wherein the amount of said elastomer made from conjugated dienes ranges from about 25 percent to about 75 percent by weight of said blend and wherein the amount of said ethylene-propylene-diene terpolymer elastomer ranges from about 75 percent to about 25 percent by weight of said blend.

9. A process for making a heterogeneous elastomer blend having a stabilized morphology, comprising the steps of:
   blending elastomer components to form a heterogeneous blend,
   said heterogeneous elastomer components comprising at least two components forming a heterogeneous blend selected from the class consisting of (1) conjugated dienes having from 4 to 12 carbon atoms, (2) natural rubber, (3) an ethylenepropylene-diene terpolymer elastomer, (4) a multi-component polymer made from a conjugated diene having from 4 to 12 carbon atoms and from monomers selected from the class consisting of (A) a vinyl aromatic having from 8 to 15 carbon atoms or (B) an olefin having from 2 to 8 carbon atoms,
   the number average molecular weight of said elastomer components ranging from about 50,000 to about 1,000,000,
   said heterogeneous elastomer blend containing from about 10 percent to about 90 percent by weight of one of said elastomer components and from about 10 percent to about 90 percent by weight of said remaining elastomer components,
   said heterogeneous elastomer blend having an initial morphology,
   crosslinking said heterogeneous elastomer by irradiating said elastomer blend,
   irradiating said elastomer blend to an extent such that said elastomer blend contains from about 0.1 to 15 percent gel, and
   processing said irradiated heterogeneous elastomer blend, said processed irradiated heterogeneous elastomer blend having essentially the same morphology as said initial morphology so that a stabilized morphology is produced.

10. A process for making a heterogeneous elastomer blend having a stabilized morphology according to claim 9, wherein the amount of irradiation ranges from about 0.1 to about 20.0 Megarads.

11. A process for making a heterogeneous elastomer blend having a stabilized morphology according to claim 9, wherein said elastomer made from conjugated dienes is selected from the group consisting of polybutadiene, polyisoprene, polypentadiene, polyhexadiene, polyheptadiene, polyoctadiene, and poly-2-dimethylbutadiene, wherein said vinyl aromatic monomer is selected from the group consisting of styrene and alphamethylstyrene, wherein said olefin monomer is selected from the group consisting of ethylene, propylene, butylene and hexadiene, and wherein said diene of said multicomponent polymer is selected from the group consisting of butadiene, isoprene, pentadiene, hexadiene, heptadiene, octadiene, and 2-dimethylbutadiene.

12. A process for making a heterogeneous polymer blend having a stabilized morphology according to claim 11, wherein the amount of gel in said blend ranges from about 0.1 percent to about 5.0 percent.

13. A process for making a heterogeneous polymer blend having a stabilized morphology according to claim 12, wherein said diene in said ethylene-propylene-diene terpolymer is selected from the group consisting of butadiene, dicyclopentadiene, ethylene norborene, hexadiene, and isoprene.

14. A process for making a heterogeneous polymer blend having a stabilized morphology according to claims 11, 27, or 28, wherein said blend contains from about 25 percent to about 75 percent of one of said elastomer components and from about 75 percent to about 25 percent of said remaining elastomer components.

* * * * *

UNITED STATES PATENT AND TRADEMARK OFFICE
CERTIFICATE OF CORRECTION

PATENT NO. : 4,220,512
DATED : September 2, 1980
INVENTOR(S) : Georg G. A. Bohm et al.

It is certified that error appears in the above—identified patent and that said Letters Patent is hereby corrected as shown below:

Column 12, line 15, "27, or 28" should read -- 12, or 13 --.

Signed and Sealed this

Sixteenth Day of June 1981

[SEAL]

*Attest:*

RENE D. TEGTMEYER

*Attesting Officer*  *Acting Commissioner of Patents and Trademarks*